United States Patent
Blate et al.

(10) Patent No.: US 12,206,796 B2
(45) Date of Patent: *Jan. 21, 2025

(54) ENDPOINT AND PROTOCOL FOR TRUSTED DIGITAL MANUFACTURING

(71) Applicant: AURA Technologies, LLC, Carrboro, NC (US)

(72) Inventors: Alex Blate, Chapel Hill, NC (US); Eric Strong, Morrisville, NC (US); Garrett Goss, Morrisville, NC (US); Douglas Bennett, Chapel Hill, NC (US); Mark Maxwell, Crestview, FL (US)

(73) Assignee: AURA Technologies, LLC, Carrboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,141

(22) Filed: Oct. 26, 2022

(65) Prior Publication Data

US 2023/0051770 A1 Feb. 16, 2023

Related U.S. Application Data

(63) Continuation of application No. 17/665,914, filed on Feb. 7, 2022, now Pat. No. 11,516,017, which is a (Continued)

(51) Int. Cl.
*H04L 9/40* (2022.01)
*H04L 9/32* (2006.01)

(52) U.S. Cl.
CPC .................. *H04L 9/3247* (2013.01)

(58) Field of Classification Search
CPC .................................................. H04L 9/3247
See application file for complete search history.

(56) References Cited

U.S. PATENT DOCUMENTS 5,933,583 A * 8/1999 Van Kuringen ...... G06F 3/1236
358/1.15
7,305,710 B2 * 12/2007 Athens ............. G07B 17/00314
713/176

(Continued)

FOREIGN PATENT DOCUMENTS

WO 2019083541 A1 5/2019

OTHER PUBLICATIONS

International Search Report for PCT/US2021/030890, Aug. 23, 2021, 2 pages.

(Continued)

*Primary Examiner* — Ghodrat Jamshidi
(74) *Attorney, Agent, or Firm* — Danielson Legal LLC (57) ABSTRACT

An endpoint for trusted fabrication, the endpoint including at least one secure controller configured for connection to a wide area network; and at least one untrusted controller configured for local communication, wherein the endpoint is configured for connection to a fabricator and further configured to receive digitally-signed data specifying at least one item for manufacture; verify the digitally-signed data; and direct the fabricator to manufacture the at least one item after verifying the digitally signed data. A method for trusted on-demand manufacturing, the method including receiving, at an endpoint connected to a fabricator, digitally signed data describing at least one item for manufacture; verifying, at the endpoint, the digitally signed data; and manufacturing the at least one item using the digitally signed data after verifying the digitally signed data, wherein the endpoint comprises at least one secure controller and at least one untrusted controller.

20 Claims, 5 Drawing Sheets

Related U.S. Application Data continuation of application No. PCT/US2021/030890, filed on May 5, 2021.

(60) Provisional application No. 63/020,191, filed on May 5, 2020.

(56) References Cited

U.S. PATENT DOCUMENTS

| | | | | |
|---|---|---|---|---|
| 7,561,694 | B1* | 7/2009 | Chakrabarti | H04L 63/104 |
| | | | | 713/171 |
| 8,414,280 | B2* | 4/2013 | Pettis | B33Y 30/00 |
| | | | | 700/118 |
| 9,692,732 | B2* | 6/2017 | Stalzer | H04L 67/14 |
| 9,754,299 | B2* | 9/2017 | Cheng | G06Q 30/06 |
| 2004/0193889 | A1* | 9/2004 | Satake | H04L 9/3263 |
| | | | | 713/176 |
| 2005/0262035 | A1* | 11/2005 | Itabashi | H04L 9/40 |
| 2009/0251605 | A1* | 10/2009 | Hsiao | G09G 5/006 |
| | | | | 348/554 |
| 2015/0007272 | A1* | 1/2015 | Zou | H04L 63/08 |
| | | | | 726/4 |
| 2015/0134955 | A1 | 5/2015 | Lacaze et al. | |
| 2015/0168934 | A1* | 6/2015 | Pai | G05B 19/0421 |
| | | | | 700/20 |
| 2016/0170694 | A1* | 6/2016 | Laurin | G06F 3/126 |
| | | | | 358/1.15 |
| 2016/0180061 | A1 | 6/2016 | Pogorelik et al. | |
| 2017/0141926 | A1* | 5/2017 | Xu | H04L 63/0209 |
| 2017/0289380 | A1* | 10/2017 | Oguchi | G06F 3/1285 |
| 2018/0259925 | A1* | 9/2018 | Fujimura | B25J 9/1674 |
| 2018/0284722 | A1* | 10/2018 | Maruno | G05B 19/409 |
| 2019/0087598 | A1 | 3/2019 | Adkins et al. | |
| 2020/0228506 | A1* | 7/2020 | Shockley | G06F 3/067 |
| 2020/0250322 | A1 | 8/2020 | Sayers | |
| 2020/0389455 | A1* | 12/2020 | Fang | H04L 63/0884 |
| 2021/0176035 | A1* | 6/2021 | Cheng | H04L 9/0662 |
| 2021/0185406 | A1* | 6/2021 | Harrington | H04N 21/4363 |
| 2021/0390178 | A1* | 12/2021 | Chida | H04L 63/1416 |
| 2022/0193994 | A1 | 6/2022 | Li | |

OTHER PUBLICATIONS

Written Opinion for PCT/US2021/030890, Aug. 6, 2021, 6 pages.

Prinsolo, J. et al. A Review of Industry 4.0 Manufacturing Process Security Risks. Applied Sciences, 9(23) (pp. 5105-5135). Nov. 26, 2019. https://www.mdpi.com/2076-3417/9/23/5105/pdf>.

Extended European Search Report for EP Application No. 21799697.4 dated Nov. 23, 2023. 10 pages.

Office Action for Japanese Patent Application No. 2022-567253 dated May 16, 2024. 2 pages.

\* cited by examiner

ENDPOINT AND PROTOCOL FOR TRUSTED DIGITAL MANUFACTURING

CROSS REFERENCE TO RELATED APPLICATIONS

The present application is a continuation of U.S. patent application Ser. No. 17/665,914, filed on Feb. 7, 2022, which is a continuation of International (PCT) Patent Application No. PCT/US2021/030890, filed internationally on May 5, 2021, and claims the benefit of and priority to U.S. provisional application No. 63/020,191, filed on May 5, 2020, the entire disclosures of each of which are hereby incorporated by reference as if set forth in their entirety herein.

TECHNICAL FIELD

Embodiments described herein relate to methods and systems for trusted on-demand manufacturing and, more particularly but not exclusively, to methods and systems for verifying digitally signed data at a fabricator before manufacturing an item.

BACKGROUND

The supply chains for modern fabrication methods, such as additive manufacturing (AM) and computer-numerically controlled (CNC) machining, include both physical raw materials and digital data elements. The digital data elements include configuration and low-level manufacturing instructions for the respective machinery and control, in whole or in significant part, the dimensional, mechanical, and sometimes material characteristics of produced items. Digital manufacturing (DM) includes these highly-data-driven manufacturing and fabrication processes. A familiar example of DM is 3D printing, wherein a computer (digital) model of an item is directly fabricated or "printed" on a 3D printer. To produce a particular item, a manufacturer needs the data elements for that item and a compatible DM machine; likewise, any change to the data elements will result in changes to the item produced—and such changes may be non-obvious to the user.

From a security standpoint, DM, writ large, has a larger attack surface than traditional manufacturing. New attack vectors in DM include disclosure or modification of data files (e.g., CAD models, AM artifacts, g code, machine parameters, etc.). Any modifications to data elements may also make it difficult to enforce process controls to ensure, for example, a given part's material, mechanical, and functional properties are substantially identical and invariant to when, where, or by whom it is manufactured.

Traceability (or a fully-fledged digital twin) is important for some parts (e.g., in aviation); this means that, for a given instance of a part, a manufacturer needs to be able to determine when, where, and by whom it was fabricated, what design files were used, what inspection criteria were applied, etc. Capturing and retrieving this type of information is a well-established process for traditionally manufactured parts, but the temporal and spatial decoupling of design, fabrication, and commissioning of digitally- and additively manufactured parts makes traceability more difficult.

At present, DM machines themselves are problematic from a cybersecurity standpoint: they typically contain sophisticated computer systems designed for standalone or industrial/commercial networked deployment but are not designed (or necessarily intended) to meet the rigorous cybersecurity certifications typically required for network deployment in defense, medical, aerospace, and other safety-critical environments and/or are not trusted more generally. The computer systems themselves can be threat vectors if connected to internal networks.

As a result, in many sensitive environments DM machines are "air-gapped" from sensitive networks and DM artifacts (data) are transported via read-only media (such as CD ROMs). More generally, even in less-stringent cybersecurity regulatory contexts, uncontrolled copies of DM artifacts are a vector for industrial espionage, sabotage, leaks of trade secrets, etc. and can lead to bypasses of quality control processes, policy/regulatory controls, etc. Specifically, the vulnerabilities introduced by uncontrolled copies of DM data and isolated DM machines include privacy, authenticity, controls, readiness, agility, and convenience. If not physically secured or destroyed, malicious actors could gain access to the data on the media. Security breaches, e.g., on the user's computer, could allow an attacker to alter DM/AM artifacts leading, e.g., to a part failing while in service. The user may, with good intentions, "tweak" or modify DM artifacts, thereby compromising process controls. At present, there is no secure way to digitally close the feedback loop (e.g., between fabrication and the overall production process) for traceability, intellectual property (IP) protections, quality analysis, etc. The process itself is cumbersome and inconvenient for the user—compared, for example, to the user clicking "print" in a web portal and printing the part on any authorized machine in the world, just like one can do with networked printers.

From a commercial standpoint, DM enables new markets wherein, rather than purchasing prefabricated items, users could purchase licenses to fabricate items on their own machinery. However, the seller, instead of delivering a physical item, is delivering data (analogous to licensed software). The commercial viability of such markets will depend on the enforcement of contractual terms, such as quantity limits or redistribution of DM data; in a digital ecosystem, such enforcement requires a strong trust relationship and certain other assurances in the process of data delivery, fabrication, and data removal (release of licensed content at the expiration of the license). However, as previously discussed, DM/AM machines themselves are generally untrusted; we thus require a mechanism to extend trust from the DM data source to the DM equipment that requires minimal trust in the DM equipment and in the users thereof. A need therefore exists for methods and systems to improve DM equipment and verify directions to fabricate an item.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to an endpoint for trusted fabrication. In some embodiments, the endpoint includes at least one secure controller configured for connection to a wide area network; and at least one untrusted controller configured for local communication, wherein the endpoint is configured for connection to a fabricator and further configured to: receive digitally-signed data specifying at least one item for manufacture; verify the digitally-signed data; and direct the fabricator to manufacture the at least one item after verifying the digitally signed data.

In some embodiments, the secure controller is configured to be unmodifiable by a user.

In some embodiments, the endpoint is further configured to generate a receipt upon completing the manufacture of the at least one item.

In some embodiments, the fabricator is a 3D printer.

In some embodiments, the untrusted controller is configured to be modifiable by a user.

In some embodiments, the endpoint is network connected.

In some embodiments, the digitally signed data is also encrypted. In some embodiments, the digitally signed data is encrypted using a key associated with the endpoint.

In some embodiments, the at least one secure controller and the at least one untrusted controller are electrically isolated from each other.

In some embodiments, the endpoint and the fabricator are co-located.

In another aspect, embodiments relate to a method for trusted on-demand manufacturing. In some embodiments, the method includes receiving, at an endpoint connected to a fabricator, digitally signed data describing at least one item for manufacture; verifying, at the endpoint, the digitally signed data; and manufacturing the at least one item using the digitally signed data after verifying the digitally signed data, wherein the endpoint comprises at least one secure controller and at least one untrusted controller.

In some embodiments, the digitally signed data is encrypted with a public key associated with the endpoint.

In some embodiments, the method further includes checking the manufactured item for compliance with at least one parameter specified in the digitally signed data.

In some embodiments, the secure controller is configured to be unmodifiable by a user.

In some embodiments, the untrusted controller is configured to be modifiable by a user.

In some embodiments, the endpoint is network connected.

In some embodiments, the digitally signed data is also encrypted. In some embodiments, the digitally signed data is encrypted using a key associated with the endpoint.

In some embodiments, the at least one secure controller and the at least one untrusted controller are electrically isolated from each other.

In some embodiments, the endpoint and the fabricator are co-located.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments herein are directed to devices, hardware, systems, methods, protocols, and other inventions pertaining to secure and/or transactional digital manufacturing, the handling of digital manufacturing data elements, and extending strong trust, policies, controls, and traceability to manufacturing and operations performed on less trustworthy or untrusted equipment and requiring minimal trust in the users operating the equipment. In security parlance, embodiments implement measures to ensure data privacy (INFOSEC) and the authenticity and integrity of data files. Some embodiments are directed to methods and devices for trusted on-demand manufacturing.

Figure 1:
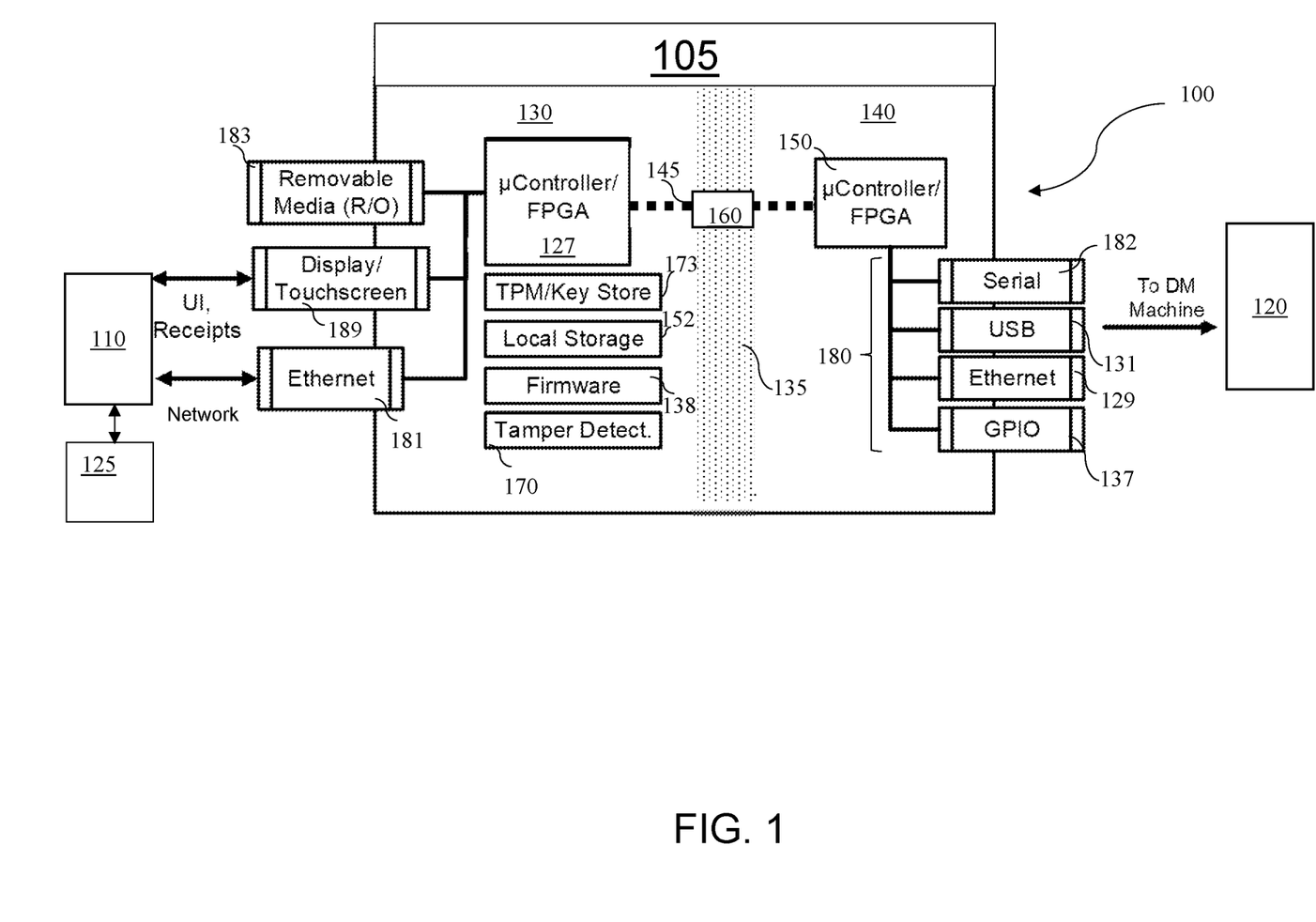
FIG. 1 depicts a block diagram of a digital manufacturing trusted endpoint in accordance with one embodiment.

FIG. 1 depicts a block diagram of an endpoint 100 in accordance with one embodiment. In some embodiments the endpoint 100 may be a trusted endpoint. In some embodiments, the endpoint 100 may be a DM endpoint.

In some embodiments, a method extends trust from DM data sources (DMDS) 110 to DM equipment. In some embodiments, the equipment may comprise the endpoint 100, herein referred to as the digital manufacturing trusted endpoint (DMTE) 105. DMTEs 105 enable DM fabrication transactions, including secure, bidirectional, transactional communication between the DMDS 110 and DMTEs 105 in some embodiments. DMTEs 105 facilitate two methods for DM fabrication transactions: networked (i.e., where there is network connectivity between a DMDS 110 and a DMTE 105) and air-gapped (i.e., non-networked). The method of transportation of data from a DMDS 110 to a DMTE 105 and vice-versa is the only substantive difference between these methods (shown in more detail in FIGS. 3 and 5) in some embodiments.

In some embodiments, the term DMDS 110 may refer to systems or services that configured to store, manage, aggregate, sell, or otherwise provide DM data. In some embodiments, a DMTE 105 may be associated with a single DMDS 110, e.g., within an organization. In some embodiments, the DMTE 105 may be associated with a plurality of DMDSs 110.

In some embodiments, a DMDS 110 (or a component thereof and/or an ancillary service) may comprise user interfaces (not shown), such as web portals and touch screens, that enable users to, among other things, request the fabrication of an item at a DM machine 120 via a DMTE 105. In some embodiments a DMDS 110 contains or communicates with a controller 125, comprising a digital manufacturing transaction manager (DMTM) which is responsible for DM fabrication transactions and, in some embodiments, is the component in communication with networked DMTEs 105. A DMDS 110 may also interface to or communicate with external (non-local) DM data sources e.g., to obtain third-party data elements for fabrication in some embodiments. In some embodiments, the controller 125 may be external to the DMTE 105 and separate from the DMDS 110. In some embodiments, the controller 125 is part of the DMDS 110.

Some embodiments use strong cryptography as the primary mechanism for establishing and verifying trust between a DMDS 110 and a DMTE 105. For the purposes of disclosure herein, public key cryptography and public key infrastructure (PKI) language will be used to describe logical cryptographic operations. As would be understood by a person having ordinary skill in the art, any cryptosystem(s) providing equivalent or stronger guarantees may be used because embodiments are not dependent on any particular cryptosystem or embodiment thereof. In some embodiments, the ultimate source of trust (chain-of-trust origin) in PKI is a set of root certificate authorities. In some embodiments it can be assumed without loss of generality that, at least within a given administrative domain, that the DMDS 110 and the DMTEs 105 are configured to trust certificates and other material signed or issued by each other's root certificate authorities (or equivalent).

Both methods (networked and air-gapped) comprise the following non-normative logical sequence of events, some of which may be optional and some of which may or may not be dependent on order-of-execution in accordance with some embodiments.

In some embodiments, the DMTE 105 may comprise a trusted computing platform 130 that is at least one of electrically or galvanically isolated with an isolation barrier 135 from the connected DM machine 120. As would be understood by one of average skill in the art, in some embodiments, electrical or galvanic isolation barriers may be implemented using, for example, opto-isolators, inductive coupling, coupling transformers, or other methods or components. In some embodiments, a DMTE 105 may comprise a "trusted side" 130 and an "untrusted side" 140. In some embodiments, the trusted side 130 is isolated from the untrusted side 140 with an isolation barrier. In some embodiments, at least one controller 127 on the trusted side 130 is electrically isolated from at least one controller 150 on the untrusted side 140 with an isolation barrier. In some embodiments, the secure controller 127 on the trusted side 130 is configured to be unmodifiable by a user. In some embodiments, the unsecured controller 150 on the untrusted side 140 is configured to be modifiable by a user.

The computing elements on the trusted side 130 communicate 145 with the DM machine 120 via communication between a secure controller 127 and an untrusted controller 150, such as a microprocessor or field-programmable gate array (FPGA). In some embodiments, this arrangement provides data and control path isolation, e.g., preventing the DM machine 120 from "breaking out" of the untrusted side 140.

In some embodiments, the DMTE 105 may be a stand-alone, self-contained embedded system or embedded device. The DMTE 105 may comprise at least two parts: a trusted side 130 and an untrusted side 140. In some embodiments, the trusted side 130 may comprise at least one interface 183 for loading DM packages, a user interface 189, and trusted computer resources, such as a secure controller 127, cryptographic key storage 173, and durable local storage 152.

In some embodiments, the untrusted side 140, with interfaces configured to connect to at least one external DM machine 120, may communicate 145 with the trusted side 130 through the isolation barrier and an untrusted controller 150, such as a microcontroller or FPGA, configured to communicate with a secure controller 127, such as an FPGA or microcontroller, on the trusted side 130. In some embodiments, the secure controller 127 may be configured for connection to a wide area network (WAN) or a local area network (LAN). In some embodiments, the untrusted controller 150 may be configured for local communication.

In some embodiments, the DMTE 105 may support being connected to at most one DM machine 120. In some embodiments, there is a one-to-one association between a DMTE 105 and a DM machine 120. In some embodiments, the DMTE 105 may be configured to connect to and operate an arbitrary DM machine 120 supporting one or more of the DMTE's external, untrusted-side interface linked to the untrusted side 140. In some embodiments, this connection may not require any modifications to the physical hardware of the DMTE 105 or the firmware 138 or software on the trusted side 130 of the DMTE 105. In some embodiments, this connection may not require any modifications to the hardware, software, and/or configuration of the DM machine 120.

In some embodiments, the trusted computing platform 130 is at least one of electrically or galvanically isolated with an isolation barrier 135 from the untrusted computing platform 140. In some embodiments, because connections on the untrusted computing platform 140 may be earth-referenced, the trusted computing platform 130 may be left floating with respect to earth ground. In some embodiments, the isolation withstand voltage of the isolation barrier 135 may be at least 5 kV.

In some embodiments, communication between the trusted computing platform 130 and the untrusted computing platform 140 may use a low-level serial or parallel interface, such as low-voltage differential signaling (LVDS), capable of only exchanging application-level data. This interface may be an isolated data channel (IDC) 160 and may be configured to support duplex and/or half-duplex operation.

In some embodiments, the IDC prevents the untrusted computing platform 140 from accessing memory, storage, or control functions on the trusted computing platform 130. In some embodiments, the IDC is not used to bridge or convey network traffic to or from the untrusted computing platform 140.

In some embodiments, other electrically or galvanically isolated logic-level signals may be passed between the controllers 127, 150 of the trusted side 130 and the untrusted side 140, but never couple signals from an external DM machine or an external untrusted side 140 interface across the isolation barrier 135.

Some embodiments may use radio frequency/electromagnetic interference (RF/EMI) shielding surrounding the untrusted side 140, providing isolation for radiated emissions with respect to the trusted side 130 and the exterior of the DMTE 105. In some embodiments, such isolation is at least 80 dBm. Some embodiments may use additional RF/EMI shielding, e.g., around the trusted side 130, power supplies, etc. Some embodiments do not assume the existence of a ground earth connection.

In some embodiments, a DMTE may use at least one form of tamper-resistance 170 that protects, at minimum, all key material and volatile memory. In some embodiments, the isolation barrier 135 may be configured to include or enclose both the trusted side 130 and the untrusted side 140 of the DMTE 105 (excluding external interfaces).

In some embodiments, protocols, interfaces, formats, and semantics with respect to DMDS-DMTE communication, DMTE PKI and key management, DM packages, and DM fabrication receipts are well-defined and standardized.

In some embodiments, the DMTE 105 may comprise a battery-backed real-time clock (RTC) or equivalent (not shown). Some embodiments may use network-based clock synchronization or other clock synchronization methods, such as GPS.

In some embodiments, a DMTE 105 may be physically installed into a DM machine, e.g., as a plug-in card or option module. In some embodiments, some substantive differences between such embodiments and "stand-alone" DMTEs are the form-factor of the DMTE itself and the type and format of the DMTE's untrusted-side external interface(s), the DM machine is still treated as untrusted, as described below, and the DMTE's trusted-side 130 interfaces, including the user interface(s), are external to the DM machine 120.

In some embodiments, a DMTE may comprise at least one trusted-side external interface. All external interfaces connecting to the trusted side 130 may be clearly marked as such and may be located well-away from untrusted-side external interfaces 180 in some embodiments.

In some embodiments, the DMTE 105 may comprise at least one 10/100/1000 Base-T Ethernet interface 181 connected to the trusted side 130 and exposed via a standard RJ-45 jack. In some embodiments, the Ethernet interface 181 may support auto-duplex, auto-MDI/MDX, and auto-negotiation.

In some embodiments, a DMTE 105 may include removable media 183, such as a built-in trusted-side DVD/CD ROM drive or other optical or magnetic storage removable-media drive. In some embodiments, this drive may be field-replaceable without special training and replacement of the drive does not activate or trigger anti-tamper mechanisms.

In some embodiments, a DMTE 105 may include trusted-side, externally accessible readers for one or more types of non-USB, flash-memory removable media 183 (e.g., SD card, CompactFlash, etc.) ("flash card readers"). In some embodiments that include flash card readers, the embodiments may take measures to guarantee that such media cannot be written to (e.g., by permanently de-asserting write enable).

In some embodiments, a DMTE 105 may include a trusted-side, externally accessible USB host port (not shown) that is restricted in hardware for use with keyboard and mouse HID devices and has all other device profiles/types permanently disabled (in hardware). In some embodiments, use of an external keyboard and/or mouse is not required for normal operations in some embodiments.

In some embodiments, a DMTE 105 may have a display, typically with resolution greater than or equal to 1024×768 and no less than six (6) inches in width or height. In some embodiments, the display is implemented by exposing a trusted-side VGA, DVI, HDMI, DisplayPort, or other display output interface 189. In some embodiments, the display is implemented as an embedded display. In some embodiments, the embedded displays are IP-65-rated (environmental rating) or higher. In some embodiments, the embedded displays are field-replaceable without special training and replacement of embedded displays does not activate or trigger anti-tamper mechanisms.

In some embodiments, a DMTE 105 may include a user input mechanism comprising a touchscreen and/or soft keys located on the perimeter of the embedded display (if applicable) at a user interface 189. In some embodiments, if soft keys are implemented, a minimum of four (4) soft keys are located adjacent to each edge of the display (left, right, top, and bottom). In some embodiments, embedded touchscreens must comply with the other requirements for embedded displays.

In some embodiments, a DMTE 105 may include other buttons, switches, lights, annunciators, general-purpose inputs/outputs (GPIOs), etc., as appropriate, coupled to the trusted side.

In some embodiments, the DMTE 105 may comprise a reader (not shown) for physical authentication tokens, such as smart cards; in these embodiments, DMTEs include a trusted-side built-in reader or include provisions for an external reader to be connected directly to the DMTE 105 via a dedicated trusted-side connector/interface (not shown).

For security, DMTEs 105 do not expose serial, JTAG, programming, or other means of direct control or modification of the DMTE's hardware, firmware, and/or software from outside the tamper-detection boundary (that is, accessing such interfaces would trigger tamper detection). In some embodiments, a DMTE 105 may be configured to expose a distinguished, dedicated, external, trusted-side interface (not shown) for performing equivalent or similar functions if and only if use of said interface requires strong authentication where the DMTE's trusted platform module (TPM) 173 may be the source-of-authority.

The trusted side 130 may comprise a security system, such as a TPM 173 or an equivalent. In some embodiments, the TPM may be responsible for "key ring" functions, such as securely storing key material, generating key material, etc., and secure storage of other information, such as certain system configuration information, as appropriate. In some embodiments, privileged operations on the DMTE 105, such as sensitive configuration, firmware upgrades, etc. require authentication to the TPM 173 or equivalent. In some embodiments, the TPM 173 may be integrated into the trusted-side processor 127. In some embodiments, the TPM 173 may comprise one or more components distinct from the trusted-side processor 127.

In some embodiments, each DMTE 105 is assigned a globally unique identifier, its DMTE ID. A DMTE ID can be used by external systems to look up the respective DMTE's corresponding public key, certificate, or equivalent. Each DMTE 105 has the ability to validate digital signatures, certificates, etc. presented to it using only locally available information (i.e., without consulting external resources). DMTE firmware is configured to be digitally signed in some embodiments. DMTEs 105 may be designed such that they do not execute or install unsigned firmware, firmware with an invalid signature, or firmware not signed by a trusted entity.

The trusted side of the DMTE 105 may comprise high-reliability flash/solid state memory (or equivalent) 152 to be used as durable storage. In some embodiments, the capacity of the durable storage is at least 32 GB. In some embodiments, the contents of this storage are encrypted at rest. In some embodiments, the key material associated with said encryption is contained in or managed by the TPM 173.

In some embodiments, the entirety of the untrusted and trusted sides 140, 130 of the DMTE 105, including firmware, programmable hardware, hardware, software, source code, etc. may be audited, vetted, and certified according to one or more industry and/or government standards for hardware and software security.

In some embodiments, some DMTE 105 embodiments may assume that any connected DM equipment 120 is untrusted and is potentially an adversary. The hardware and software of a DMTE 105 are designed such that it is not possible for an attacker or adversary to gain control of, access or modify data, or otherwise compromise the trusted side of the DMTE 105 from the untrusted side 140 except to the extent that the behavior of the untrusted side 140, such as an electrical malfunction, may cause loss or denial of service to the DMTE 105 itself. As will be understood by one of average skill in the art, in the context of cybersecurity, the nouns "attacker" and "adversary" are broadly-construed to include humans, organizations, machines, or other automata.

In some embodiments, the trusted side 130 has the ability to reboot, reset, and reflash/reload the firmware (or reprogrammable logic) of the untrusted side 140.

In some embodiments, the untrusted side 140 does not contain any non-volatile memory or durable storage that is writable by the untrusted side 140 and/or cannot be forcibly and reliably cleared or overwritten by the trusted side 130.

The only assertion of trust in the untrusted side 140 of the DMTE 105 and the attached DM machine 120 in some embodiments is that DM instructions, configuration, and commands sent to the untrusted side 140 by the trusted side 130 are be faithfully conveyed to the DM machine 120, that the DM machine 120 will faithfully apply and execute exactly said instructions, configuration, and commands and provide truthful information/feedback in response to informational queries (e.g., job progress, firmware version, loaded material, etc.), and that the untrusted side 140 will faithfully convey said information/feedback to the trusted side 130. Any DM machine 120 that cannot satisfy this assertion may be unusable for any application requiring or expecting any form of reliable fabrication.

Certain aspects of policy enforcement and controls, such as the validation of fabricated parts, may assume that authenticated users interacting with DMTE 105 (also referred to as "operators" herein) are trustworthy and acting in good faith. That is, any aspect of policy or enforcement or controls whose correctness or integrity relies on user input must, by implication, be preconditioned on the user being trustworthy and acting in good faith. In some embodiments, automated quality control or testing may be leveraged to reduce reliance on operator trustworthiness.

In some embodiments, a DMTE 105 never uploads or copies DM data from DM data sources 110 to durable storage on DM machines 120 unless this is required for the DM machine 120 to function and the policy/control metadata in the DM package (securely provided by the DMDS 110) explicitly permits such uploading or copying.

In some embodiments, DMTEs 105 store encrypted DM packages (or parts thereof) on durable local trusted-side storage 152. In some embodiments, any data stored on durable local trusted-side storage 152 may be permanently deleted upon transaction closure.

Unencrypted DM package content (other than specific metadata) is never written to durable storage 152 in some embodiments. In some embodiments, such content may be stored in volatile memory under the condition that it is guaranteed to be permanently erased or overwritten upon transaction closure.

In some embodiments, a DMTE may generate a receipt for completed transactions. In some embodiments, a receipt may include information pertaining to the fabricated parts (quantity, quality control data, etc.), the operator (user), and/or other information as is required to satisfy policy, control, and/or contractual guarantees. In some embodiments, the receipt may comprise encrypted content.

In some embodiments, each DMTE 105 is configured to store digitally signed receipts in durable storage 152 for a minimum period of time, typically at least 180 days. During this time, authorized users are able to retrieve and view issued receipts and, as applicable, upload them to the DMDS 110 or other authorized destinations.

In some embodiments, DMTEs 105 may not contain integrated radio transceivers (e.g., 802.11 or Bluetooth) unless such transceivers are unavoidably embedded in other components (e.g., system-on-chip integrated circuits) and all radio frequency (RF) inputs and outputs are permanently tied to signal ground and fully contained within the tamper-detection boundary 170.

In some embodiments, DMTEs 105 include untrusted-side external interfaces 180 for connecting DM machines 120. In some embodiments, an external interface 180 connecting to the untrusted side 140 may be clearly marked as such and may be located well-away from trusted-side external interfaces (e.g., 189).

In some embodiments, DMTEs 105 may have an untrusted-side, 2-wire or 4-wire RS-232 serial interface 182; this interface 182 may be exposed via a 9-pin D-style connector (not shown). In some embodiments, DMTEs 105 may have an untrusted-side, 4-wire RS-485 serial interface 182. In some embodiments, if implemented, the RS-485 interface 182 may be capable of operating in 2-wire (half-duplex) and 4-wire (full-duplex) modes.

DMTEs 105 may have an untrusted-side 10/100 Base-T Ethernet interface 129 exposed via an RJ-45 jack. In some embodiments, this interface 129 may be configured to support auto-negotiation of speed, MDI/MDX, and duplex. In some embodiments, this interface 129 may not be connected, bridged, or otherwise associated in any with trusted-side Ethernet 181 or other trusted-side network interfaces. Some embodiments optionally support 1000 Base-T Ethernet.

In some embodiments, DMTEs 105 may have an untrusted-side USB 2.0 (or higher) host interface 131 exposed via a type-A or type-C female jack (not shown).

In some embodiments, DMTEs 105 may include an untrusted-side USB 2.0 (or higher) device interface 131 exposed via a type-B or type-C female jack (not shown). In some embodiments, the implementation of the USB host interface may also be capable of or can be reconfigured for device mode operation, in which case, the same interface may be used for both host and device modes.

In some embodiments, DMTEs 105 may comprise at least four (4) untrusted-side, single-ended general-purpose input/output (GPIO) 137 logic-level connections; if included, this interface is typically exposed via a 5-terminal Phoenix-style terminal block (or equivalent) with the fifth pin connected to the respective logic-level ground (0 V).

Figure 2:
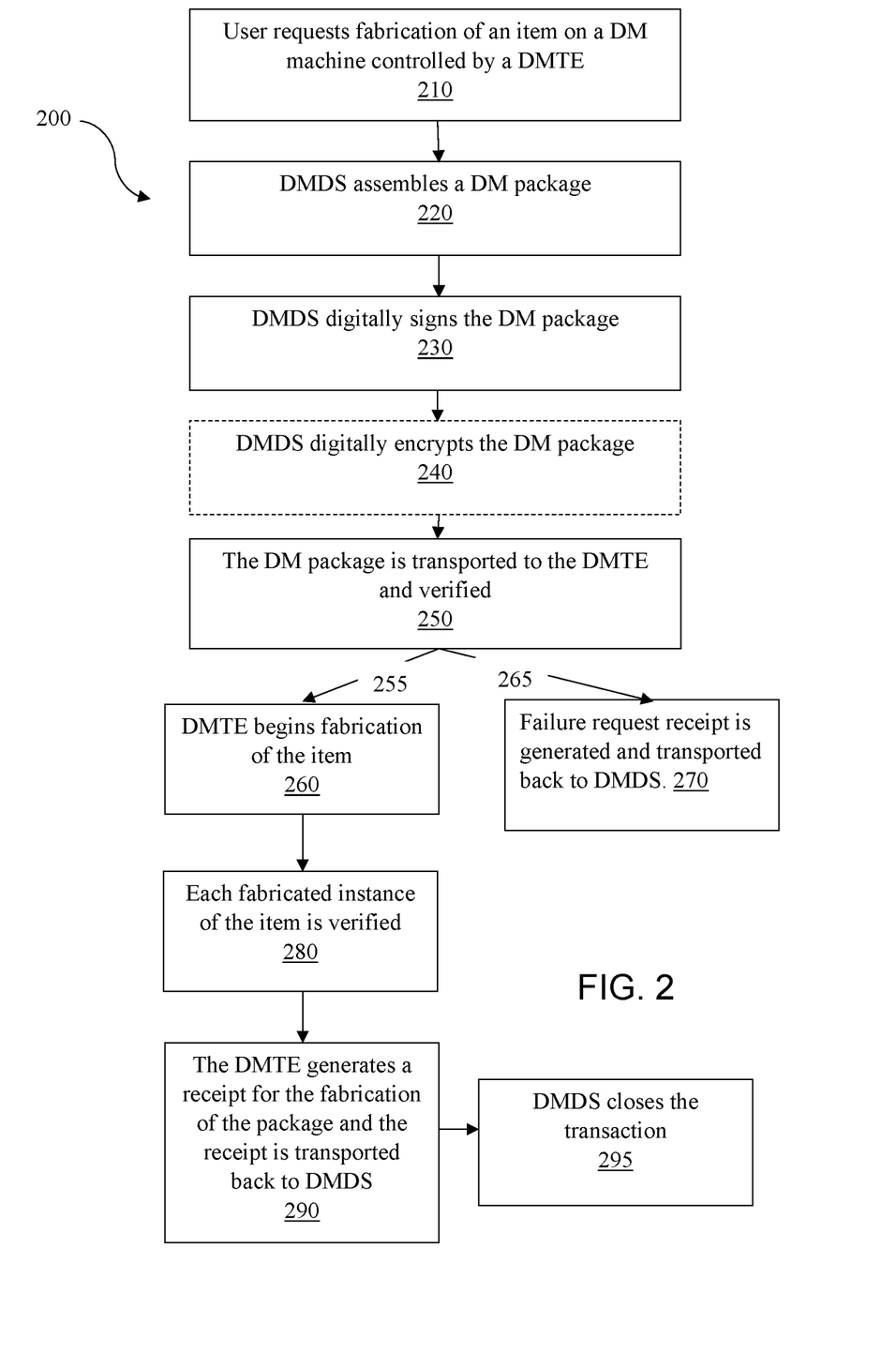
FIG. 2 depicts a flow chart of a method for trusted on-demand manufacturing in accordance with one embodiment.

FIG. 2 depicts a flow chart of a method for trusted on-demand manufacturing 200 in accordance with one embodiment.

In some embodiments, a user requests fabrication of a specific item on a particular DM machine that is controlled by a DMTE (Step 210). In some embodiments, the request may specify certain parameters, such as material, quantity, etc. of the item bring produced. If the request is permitted according to parameters set within the DMTE, a new DM transaction begins. In some embodiments, the request may not be permitted according to parameters set within the DMTE, such as a method to manufacture a weapon. In such a case, if the DMTE recognizes the request as an impermissible request, the DM transaction request will be terminated.

In some embodiments, after the request is permitted, the DMDS assembles a DM package for the specific item to be fabricated on the DM machine (Step 220). In some embodiments, a DM package may include fabrication instructions, such as g-code as well as control/policy assertions, such as machine configuration, maximum quantity, etc.

In some embodiments, the DMDS digitally signs the DM package with its signing certificate (or equivalent) (Step 230). In some embodiments, this signature is an assertion that the DM package originated from a specific DMDS.

In some embodiments, the DMDS encrypts the DM package (Step 240). In some embodiments, this encryption may be used to ensure data privacy over the DM package's contents. In some embodiments, the DMDS may encrypt at least one of the DM package or the signed contents therein using the DMTE's public key (or equivalent). In some embodiments, the DMDS may not encrypt the DM package.

In some embodiments, the DM package is transported to the DMTE and, optionally, the DM package is decrypted and verified (Step 250). In some embodiments, the DMTE may verify the digital signature of the DM package and the digital signatures of any signed content. In some embodiments, if at least one of decryption or signature verification fails (Step 265), a receipt indicating request failure is generated and transported back to the DMDS (Step 270).

In some embodiments, upon successful decryption and signature verification (Step 255), the DMTE may begin fabrication of the specific item (Step 260). In some embodiments, the DMTE may begin fabrication in cooperation with an operator (user).

In some embodiments, each fabricated instance of the specific item is verified and the DMTE notes whether or not verification passed (Step 280).

When the quantity specified in the DM package has been exhausted (verified-passed instances of the specific item) or upon operator request to end fabrication of the DM package or upon other termination of the DM package, the DMTE generates a receipt for the fabrication of the DM package and the receipt is transported back to the DMDS (Step 290).

Upon reception of a valid receipt for the DM package, the DMDS completes and closes the transaction (Step 295).

Figure 3:
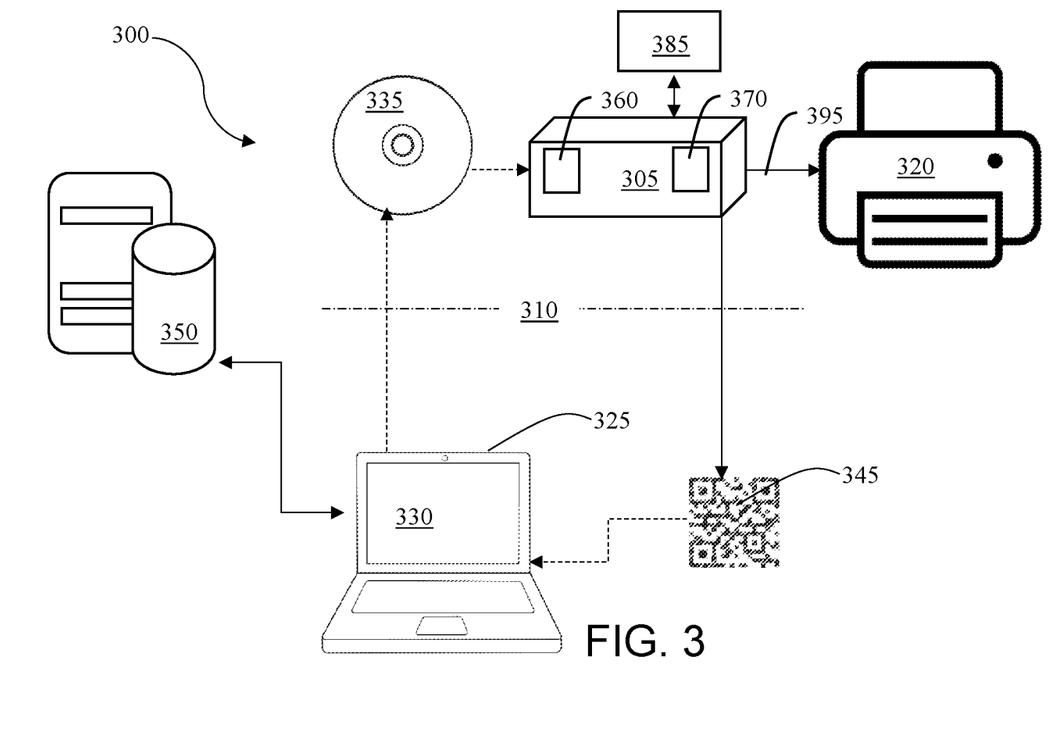
FIG. 3 depicts a digital manufacturing trusted endpoint having an air gap traversal in accordance with one embodiment.

FIG. 3 depicts a DMTE 305 having an air gap traversal 310 in accordance with one embodiment 300. In some embodiments, the DMTE 305 and a fabricator, such as DM machine 320, may be co-located.

In some embodiments, the signed, encrypted DM package may be downloaded by a user 325 at an interface 330, written to removable media 335, such as a CD/DVD ROM, and transported across the air gap 310 to the DMTE 305. In some embodiments, the DM package may be physically transported. In some embodiments, the DMTE 305 may generate a receipt 345 that is physically transported across the airgap 310 after fabricating the requested item at the DM machine 320. In some embodiments, the DM machine may be a 3D printer. In some embodiments, the receipt 345 may be a QR code.

In some embodiments, each DM package assembled by the DMDS 350 may comprise a globally unique transaction identifier. In some embodiments, the identifier may be in the form of a type-4 UUID (RFC 4112). In some embodiments, the identifier may comprise a UTC timestamp with precision to one second.

In some embodiments, the receipts 345 may be digitally signed by the DMTE 305. In some embodiments, values in receipts 345 are encrypted by the DMTE 305, e.g., under the DMDS's public key, in which case a second digital signature over the receipt 345 may also be included. In some embodiments, at least one receipt 345 may be partially or fully encrypted. In some embodiments, the receipt 345 may include a transaction identifier UUID of the corresponding unencrypted DM package.

In some embodiments, the receipts 345 may be retained in durable storage 360 on the DMTE 305.

In some embodiments, unless explicitly permitted by the policy/control metadata of the DM package, a DMTE 305 will not accept a DM package having a transaction identifier UUID matching any DM package for which the DMTE 305 has issued a receipt; one of average skill in the art will recognize this as a form of defense against replay attacks.

In most embodiments, stored receipts 345 may be viewable on a display 370 associated with the DMTE 305. In some embodiments, the display 370 may be co-located on the DMTE 305. In some embodiments, the stored receipts 345 may be viewable as at least one of a QR code, PDF417 2D barcode, or other machine-readable graphical format. In some embodiments, an operator may be able to print hardcopy receipts in the same format.

In some embodiments, for air-gapped transactions, the DMTE 305 presents the receipt 345 on its display 370 and requests user confirmation (i.e., that the receipt has been captured) prior to accepting a subsequent air-gapped transaction. In networked transactions, the receipt's digital content is transmitted to the DMDS 350 over the network. In some embodiments, the digital content may be transmitted in an alphanumeric or binary form.

In some embodiments, the DMDS 350 may expose an API that accepts receipts in the form of images (e.g., digital photographs of the 2D barcodes). In some embodiments, the DMDS 350 may expose an API that accepts receipts in binary or character string form, e.g., the decoded content of the receipt.

In some embodiments, a cross-platform mobile application be made available to users whereby, using a mobile device with a digital camera, a user can photograph or scan a receipt and upload it to the DMDS 350 or other authorized systems.

In some embodiments, the receipt 345 used for air-gapped transactions 300, or other non-machine-machine interactions may take forms other than that of a 2D barcode, image, or equivalent. For example, a receipt 345 may be presented as a string of characters that the user transcribes and conveys to the DMDS 350. In some embodiments, the data in the receipt 345 is able to be securely conveyed from the DMTE 305 to the DMDS 350 in a one-way manner and without direct connectivity between the DMTE 305 and the DMDS 350 (i.e., across the air gap 310).

In some embodiments, the DMTE 305 may further comprise a printer 385 or printing device connected to the trusted side; in some embodiments, the printer 385 is integrated into the DMTE 305; in some embodiments, the printer 385 is external to the DMTE 305 and connected to an interface provided on the trusted side. In embodiments having a printer 385, the printer 385 may be used for printing (paper, physical) receipts 345 for conveyance across the air gap 310. In some embodiments, the printer 385 is further used for printing hard copies of other information, such as inspection results.

In some embodiments, when a user submits a receipt to the DMDS 350 for an air-gapped 310 transaction, the submission affirms that the removable media 335 and any copies of its contents have been securely destroyed or erased. In some embodiments, DM package(s) stored on the removable media 335 may be strongly encrypted.

In some embodiments, upon issuance of a receipt 345, the DMTE 305 may permanently erase the DM package and any content thereof (except such content as may be contained in the receipt for said DM package) from all local storage 360 (exclusive of removable media, which is read-only) on the DMTE 305.

In some embodiments, the DMTE 305 has the ability to receive and queue multiple concurrent DM transaction requests and DM packages. In some embodiments, if queuing is supported, the operator may be able to, via an interface 330 or a user interface associated with the DMTE 305, select which DM package to fabricate and/or switch or alternate between multiple queued packages. This feature enables several parts to be fabricated sequentially, e.g., components of an assembly or for time-sharing of the DM machine 320.

In some embodiments, air-gapped DMTEs 305 (i.e., DMTEs that never communicate with a DMDS 350 over a network) are capable of being configured such that they are able to accept DM requests and packages from multiple DMDSs 350.

In some embodiments, DMTEs 305 are configured such that authorized operators (users) can request the fabrication of ad-hoc, unofficial, and/or unsigned DM packages (e.g., for prototyping, testing, or under extenuating circumstances) stored and delivered on removable media 335. In some embodiments, during such fabrication, the DMTE 305, at all times, conspicuously displays a message on the display 370 indicating that an ad-hoc fabrication is in progress. While no "transactions" exist for such fabrications, the DMTE 305 may generate and record receipts 345 for such fabrications. In some embodiments, "ad-hoc" fabrication is disabled by default and is not enabled in production or deployment environments.

In some embodiments, the hardware of the DMTE 305 may ensure that the media 335 is accessed in a read-only manner, i.e., the DMTE's hardware ensures that data cannot be written to the media 335.

In some embodiments, the removable media 335 is a non-volatile memory module, such as a flash or SD card. In these embodiments, the hardware read-only guarantee can be implemented by physically disconnecting the "write enable" pin/connection on the respective trusted-side external connector. In some embodiments, the write enable pin is clipped or removed completely from the connector. In some embodiments, this allows the convenient use and reuse of an unmodified non-volatile memory module for conveying DM packages to the DMTE 305 while guaranteeing that the media will not be written to on the DMTE 305 side of the air gap 310.

In some embodiments, the media 335 may comprise a container configured to store files and documents, such as at least one of a machine-readable metadata file, a machine-readable DM machine configuration file, a DM fabrication file, a machine-readable and machine-executable inspection or testing specification file, a human-readable document or file, a machine-readable DM machine interface definition file, or a digital signature. In some embodiments, the container of the media 335 may be digitally signed. In some embodiments, the signature may be stored separately or placed within the container. In some embodiments, the metadata files describe the contents of the container and the corresponding DM recipe. In some embodiments, the metadata files may further specify specific actions to be taken prior to, during, and/or following DM fabrication. In some embodiments, the metadata files contain machine-readable declarations and parameterizations of policies, controls, or other rules to be enforced or applied to an associated DM transaction.

In some embodiments, the metadata files define the exact DM machine 320 or equivalence class of DM machines that the recipe is compatible with. In some embodiments, defining the exact DM machine 320 may include the model, manufacturer, firmware revision, etc. of the DM machine 320. In some embodiments, the DM machine 320 may be configured to interface any present files. In some embodiments, the DM machine 320 may define how an endpoint shall communicate with the specified DM machine 320, including, but not limited to, data encoding, timing, electrical/signaling method, physical-layer protocol(s), application-layer protocol(s), and error-handling semantics.

In some embodiments, the conjunction of the metadata, DM machine configuration, DM fabrication files, and, if applicable, DM interface files, may fully-define and constrain the fabrication of a specific item on a specific DM machine 320 from specific material(s) (e.g., a particular metal alloy powder).

In some embodiments, the container on the removable media 335 is an archive file, such as ZIP or TAR. In some embodiments, the container supports data compression.

In some embodiments, the DM recipe may further contain digital signatures on one or more of its contents. In some embodiments, these digital signatures assert the source-of-authority or provenance of the respective contents.

In some embodiments, one or more of the contents may be encrypted. In some embodiments, the metadata further comprises specifications for specific contents of DM receipts generated for DM transactions for the given recipe.

In some embodiments, there will exist many DM recipes for a given item where each recipe is specific to fabrication on a particular DM machine 320 out of particular material(s).

In some embodiments, the DM recipe is developed, validated, and certified such that items fabricated according to the recipe, including passing inspection, testing, etc., will have, with high confidence, predictable and well-characterized mechanical, dimensional, material, aesthetic, and/or other properties. In some embodiments, these properties may be invariant to where and when the item is fabricated. In some embodiments, these properties are invariant among multiple (types of) DM machines for given material(s).

In some embodiments, two or more of the files comprising a recipe are combined into a single file and/or one logical file may be broken into multiple separate files.

Some embodiments may comprise the method, mechanism, protocol, and system component of a DM package. In some embodiments, the DM package may comprise a container, a DM recipe, at least one machine-readable metadata file, DM transaction metadata, including a DM transaction identifier (ID), and one or more digital signatures. In some embodiments, the DM recipe, metadata files, and DM transaction metadata are contained in the container and may be digitally signed. In some embodiments, the signature may be stored separately or placed within the container. In some embodiments, the metadata files fully-describe the content of the container.

In some embodiments, the metadata files and the DM transaction metadata, or the conjunction thereof, identify the endpoint or endpoints intended to execute the corresponding DM transaction. In some embodiments, the DM transaction metadata contains machine-readable declarations and parameterizations of policies, controls, or other rules to be enforced or applied to the transaction. In some embodiments, the declarations and parameterizations may be in addition to that which may be specified in the DM recipe.

In some embodiments, the container is an archive file, such as ZIP or TAR. In some embodiments, the container supports data compression. In some embodiments, the DM package may further contain digital signatures on one or more of its contents. In some embodiments, these digital signatures assert the source-of-authority or provenance of the respective contents. In some embodiments, the signed data in the DM package may also be encrypted.

In some embodiments, the DM package is conveyed to the fabrication environment via removable digital media 335, such as a CD/DVD ROM or removable storage device. In some embodiments, the DM package is conveyed to the fabrication environment via a computer network. In embodiments where the DM package is to be conveyed to a DMTE 305, the DM package comprises the set of metadata, DM recipe, and files necessary to fulfill a DM transaction request for a particular item on the particular DM machine 320 served by a particular DMTE 305. In some embodiments, no other external information is required by the DMTE 305 to fulfill the transaction request.

In some embodiments, the DM recipe contains all data files, metadata, machine configuration, user instructions, actionable inspection or acceptance requirements, materials specifications, and/or other information required to fabricate a given item out of a particular material on a particular DM machine 320. In some embodiments, the DM recipe may be transmitted 395 from the DMTE 305 to the DM machine 320 with at least one of a serial drive, a USB, a P2P network, or other equivalent recognized by a person having ordinary skill in the art.

In some embodiments, enforced policies, controls, and/or rules include limitations on the number of parts that can be fabricated from the package, a date and time after which the package is invalid (or may not be fabricated), delivery information for fabricated parts, or requirements for users performing inspections.

In most embodiments, at-rest and in-transit (on-the-wire) DM package files may be encrypted, typically under the DMTE's or recipient's public key (or equivalent). The decrypted file may be digitally signed by the respective DMDS 350 (data source or source of authority) and its contents may be digitally signed (individually or severally) by their respective source(s) of authority.

In some embodiments where the DMTE's untrusted side comprises a programmable logic device, such as an FPGA or a microcontroller, a recipe may further comprise one or more firmware/bitstream files to be used to program the untrusted side; this allows the system to add support for new DM machines in a data-driven manner, and without modifying the DMTE itself; it also strengthens the recipe, in that each item fabricated from the recipe is fabricated using the same interface logic/firmware.

Figure 4:
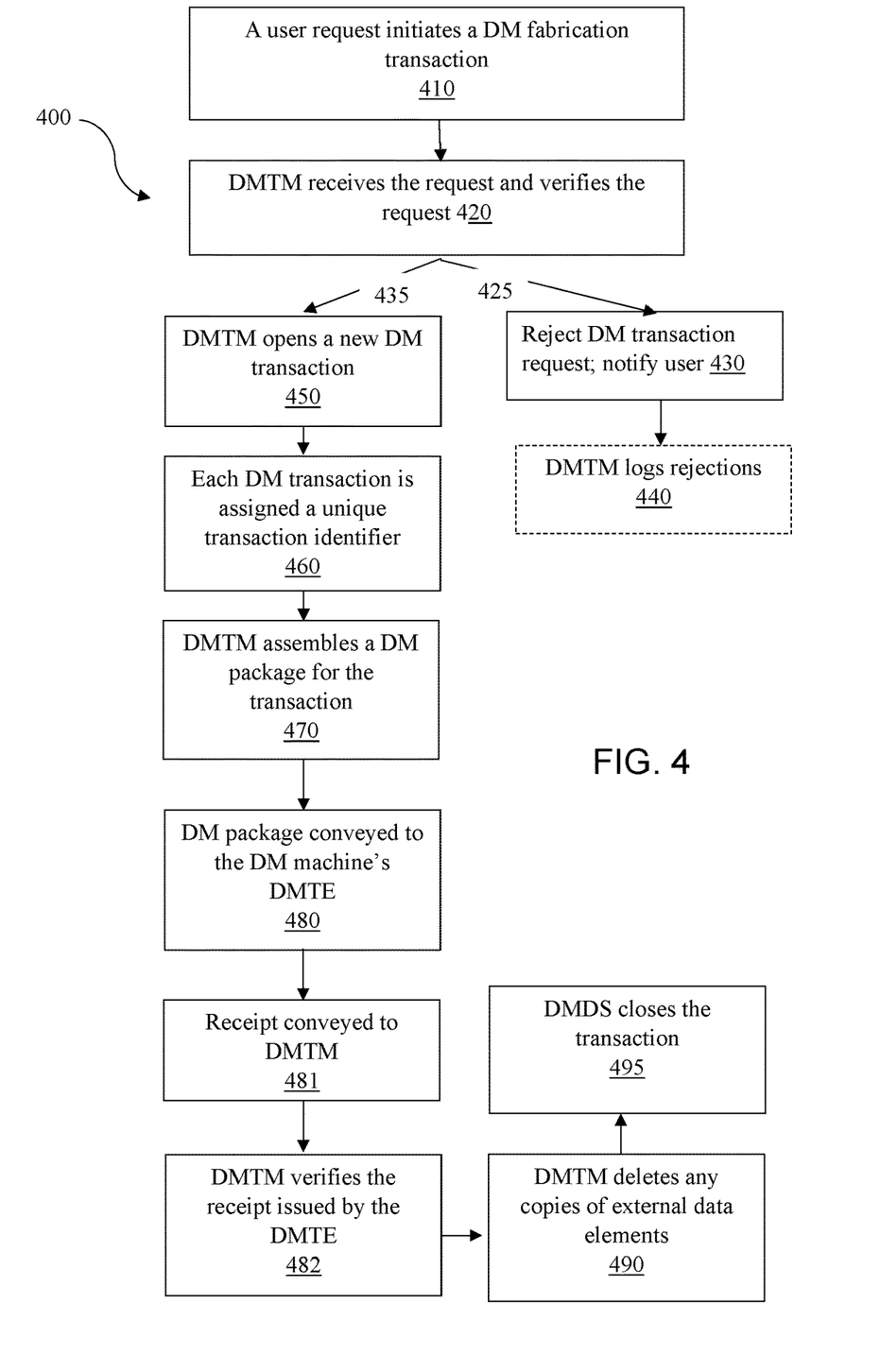
FIG. 4 depicts a flow chart of a method for digital manufacturing transactions in accordance with one embodiment.

FIG. 4 depicts a flow chart of a method for digital manufacturing transactions 400 in accordance with one embodiment. In some embodiments, DM fabrication transactions are implemented by a DM transaction manager (DMTM). In some embodiments, DMTM is a component of a DMDS or enclosing system.

In some embodiments, a user request initiates a DM fabrication transaction ("transaction") (Step 410). In some embodiments, the user submits the request through a user interface or API. In some embodiments, the transaction request may comprise the identity of the requesting user, the identifier of an specific item to be fabricated, the identifier a specific DM machine, and, as applicable, the specific DM recipe specified by the user. In some embodiments, the request may further include a specific material or materials from which the item should be fabricated. In some embodiments, a DM recipe is chosen automatically by DMTM, DMDS, or another component.

In some embodiments, upon receipt of a DM transaction request, DMTM verifies the request (Step 420). In some embodiments, the verification may comprise at least one of verification that the requesting user is authorized to access and fabricate the given item, verification that the requesting user is authorized to request fabrication on the selected DM machine, verification that, if specified, the selected DM recipe is compatible with the selected DM machine, if a DM recipe is not selected, verification that there exists a DM recipe compatible with the selected DM machine, verification that the facility where the selected DM machine is located is capable of performing required quality control or inspections, verification that the selected item is authorized to be fabricated at the location of the selected DM machine (e.g., to comply with International Trafficking in Arms Regulations (ITAR) requirements or other contractual obligations), or verification that the requested manufactured item is in compliance with at least one parameter specified in the digitally signed data.

In some embodiments, if verification fails (Step 425), the DM transaction request is rejected (Step 430). In some embodiments, the DMTM takes action(s) to cause the requesting user to be informed that the request was rejected. For example, in some embodiments, a user may receive an alert at an interface that that DM transaction was rejected. In some embodiments, the DMTM may beep or include a warning light to indicate to the user that the request was rejected.

In some embodiments, DMTM may create log entries for rejected transaction requests (Step 440). In some embodiments, such entries may not be associated with a transaction identifier, especially in cases where a transaction was never opened/begun.

In some embodiments, if verification passes (Step 435), DMTM opens a new DM transaction for the request (Step 450).

In some embodiments, each DM transaction is assigned a unique transaction identifier (Step 460). In some embodiments, the identifier may be in the form of a type-4 UUID [RFC 4122]. In some embodiments, from Step 460 onward, all state changes or updates pertaining to this transaction are durably stored.

In some embodiments, DMTM assembles a DM package for the transaction (Step 470). In some embodiments, DMTM resolves and obtains any non-local data elements required for fabrication. DM fabrication may fail at this point if said external resources are not available or said requests are rejected. In this event, DMTM closes the transaction with a failure status.

If all elements are successfully resolved, the DM package may be conveyed to the selected DM machine's DMTE or equivalent (Step 480) where the item is fabricated. In some embodiments, a receipt may be conveyed to DMTM (Step 481).

In some embodiments, DMTM verifies the receipt issued by the DMTE or equivalent (Step 482). Some embodiments have well-defined semantics and procedures for handling invalid receipts.

In some embodiments, after receipt verification, DMTM may delete any copies of external data elements it may have in its possession (Step 490). In some embodiments, DMTM forwards the receipt to third-party owners of external data elements or other authorized agents; if third-party licenses are involved in the transaction, the respective license(s) are released in communication with the licensor.

In some embodiments, DMTM closes the transaction (Step 495). In some embodiments, closing the transaction 495 may include DMTM issuing notifications to other systems, agents, users, etc., as applicable.

In some embodiments, DMTM periodically examines open transactions and, as appropriate, request status from networked DMTEs (or equivalent). In some embodiments, DMTM examines open transactions on demand and, as appropriate, request status from networked DMTEs (or equivalent). For open transactions that have associated licenses/leases, DMTM has a mechanism for informing the requesting user, supervisors, or other designated personnel that the respective licensed/leased content has not been released and/or takes other such actions as are specified in policy or provided by the implementation in some embodiments.

In some embodiments, authorized users may terminate open transactions awaiting a receipt, for example, in a case where a fabrication facility is destroyed or due to equipment failure. This type of transaction termination results in an unambiguous record in the transaction log that includes the identity of the user who requested transaction termination. If the transaction is associated with a license/lease, DMTM may transmit a distinguished form of receipt to the lessor/licensor, i.e., making it unambiguous that the transaction did not terminate normally and DMTM may provide the lessor/licensor with any interstitial information it may have about the DM transaction, such as DM fabrication counts reported by the DMTE during periodic status checks.

In some embodiments, transaction log entries for the opening, closing, receipt recording, abnormal termination, lease acquisition, and lease release are digitally signed by the DMTM. In some embodiments, DMTM may sign any transaction log entries, as appropriate.

In some embodiments, DMTM supports the ability to transactionally- and atomically-manage the fabrication of composite items (items that are assemblies of several other items). In some embodiments, DMTM supports the ability to fulfill DM fabrication requests across multiple DMTEs (e.g., when multiple instances of an item are needed).

In some embodiments, DMTM supports the ability for authorized users to view pending (open) transactions for a particular DMTE (or equivalent) or groups thereof and for authorized users to set the priorities of pending jobs queued for each machine.

Figure 5:
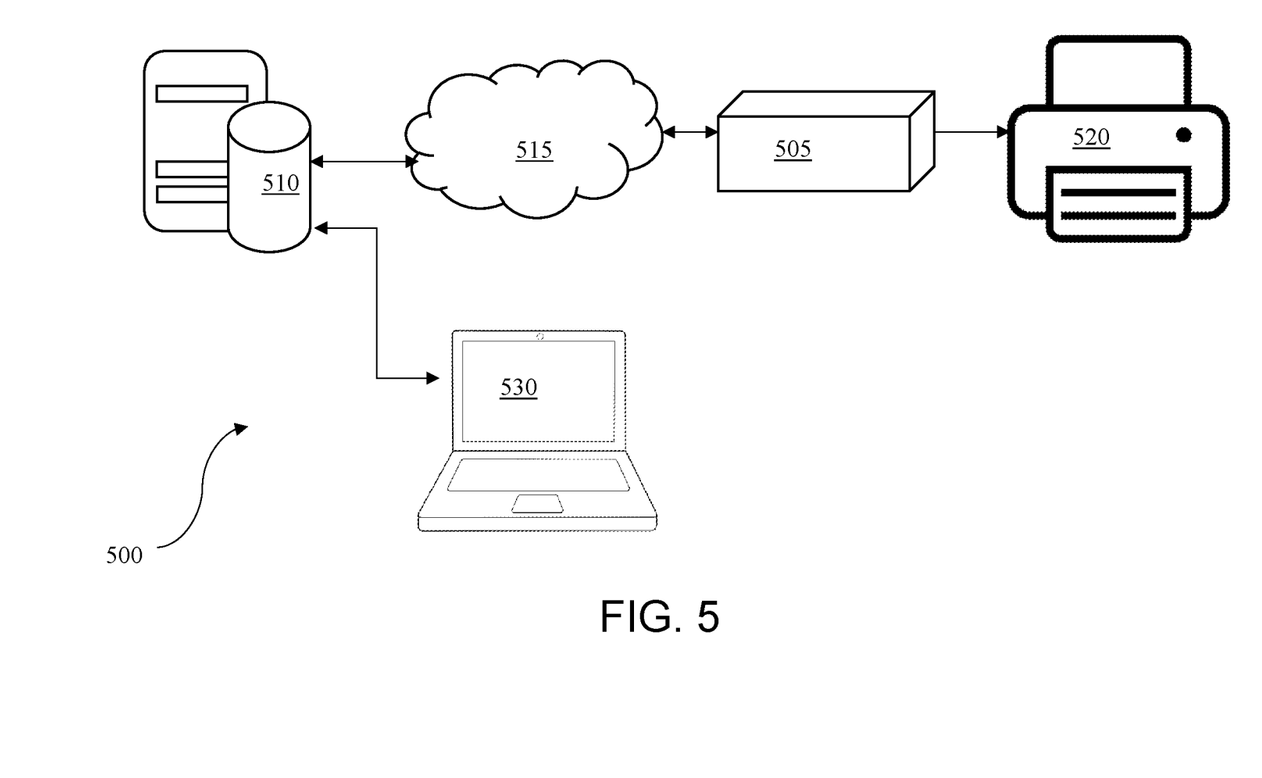
FIG. 5 depicts a block diagram of network-connected fabrication at a digital manufacturing trusted endpoint in accordance with one embodiment.

FIG. 5 depicts a block diagram 500 of network-connected fabrication at a digital manufacturing trusted endpoint 505 in accordance with one embodiment. In some embodiments, the signed, encrypted DM package is transmitted from the DMDS 510 over a network 515 to the DMTE 505. The receipt is likewise transmitted back to the DMDS 510 after completion of fabrication at the DM machine 520.

In some embodiments, a user may interact directly or indirectly with the DMDS 510 at an interface 530. In some embodiments, the user may be remote with respect to the DMDS 510 and/or DMTE 505. In some embodiments, the DMTE 505 and the DM machine 520 are co-located.

In some embodiments, the user who requested a given networked DM fabrication transaction and other authorized users have the ability, via interaction with the DMDS 510 or another authorized system, to verify that the corresponding DM package was delivered to the corresponding DMTE 505, to check whether a receipt has been received, to view said receipt, and to see other relevant transaction information.

In some embodiments, authorized users have the ability to, via the DMDS 510 or another authorized system, abort networked DM fabrication transactions prior to delivery of the respective DM packages to the respective DMTEs 505. In this case, no receipt is generated, and the transaction is closed.

In some embodiments, authorized users, via the DMDS 510 or another authorized system, may abort a DM fabrication transaction for which fabrication has not yet commenced. In this case, the DMTE 505 issues and transmits a receipt indicating that fabrication did not commence, and the transaction is closed normally.

In some embodiments, upon receipt of a networked DM fabrication request and the associated DM package, the DMTE 505, via its display and/or other annunciators, may alert the operator that a new "job" has arrived.

In some embodiments, further interaction between the operator and DMTE 505 may be required, e.g., to confirm loading of input materials or other preparatory procedures.

In some embodiments, the operator has the ability to reject a networked DM fabrication request. In such cases, the DMTE 505 issues and transmits a receipt indicating that fabrication did not commence, and the transaction is closed normally.

In some embodiments, upon receipt of a valid DM package, the DMTE 505 will notify the respective DMDS 510 that it has received said package and that the package is valid.

In some embodiments, a DMDS 510 is able to securely query a networked DMTE 505 about the status of any DM fabrication request (identified by transaction identifier UUID) including fetching the corresponding receipt (if it has been issued).

In some embodiments, network connections 515 between the DMDS 510 and the DMTEs 505 are via a secure, encrypted protocol (such as transport layer security). In some embodiments, establishment of said connection will include mutual authentication, e.g., via client and server certificates. Some embodiments implement additional security mechanisms at other protocol layers.

In some embodiments, upon completion of a networked transaction, the DMTE 505 attempts to transmit the corresponding receipt to the requesting DMDS 510 instance, whereupon the DMDS 510 informs the DMTE 505 of successful delivery of the receipt. In some embodiments, if the DMTE 505 is unable to deliver the receipt, it may reattempt delivery at randomly chosen times, typically separated by at least 30 minutes and receipt redelivery will terminate after some time interval, typically not to exceed 72 hours.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

What is claimed is:

1. An endpoint comprising:
   at least one secure controller configured for connection to a network; and
   at least one untrusted controller configured for local communication,
   wherein the endpoint is configured for connection to an entity and further configured to:
      receive digitally signed data specifying an instruction for the entity;
      verify the digitally signed data;
      direct the entity to execute the instruction after verifying the digitally signed data, and the secure controller has a cryptographic trust relationship with at least one source of the digitally signed data.

2. The endpoint of claim 1, wherein the secure controller is configured to be unmodifiable by a user.

3. The endpoint of claim 1, wherein the endpoint is further configured to generate a receipt upon completing the instruction.

4. The endpoint of claim 1, wherein the untrusted controller is configured to be modifiable by a user.

5. The endpoint of claim 1, wherein the endpoint is network connected.

6. The endpoint of claim 1, wherein the digitally signed data is also encrypted.

7. The endpoint of claim 6, wherein the digitally signed data is encrypted using a key associated with the endpoint.

8. The endpoint of claim 1, wherein the at least one secure controller and the at least one untrusted controller are electrically isolated from each other.

9. The endpoint of claim 1, wherein the endpoint and the entity are co-located.

10. A method comprising:
    receiving, at an endpoint connected to an entity, digitally signed data describing an instruction for the entity;
    verifying, at the endpoint, the digitally signed data; and
    executing, via the entity, the instruction after verifying the digitally signed data,
    wherein the endpoint comprises at least one secure controller configured for connection to a network, and at least one untrusted controller configured for local communication, wherein the secure controller has a cryptographic trust relationship with at least one source of the digitally signed data.

11. The method of claim 10, wherein the digitally signed data is encrypted with a public key associated with the endpoint.

12. The method of claim 10, wherein the secure controller is configured to be unmodifiable by a user.

13. The method of claim 10, wherein the untrusted controller is configured to be modifiable by a user.

14. The method of claim 10, wherein the endpoint is network connected.

15. The method of claim 10, wherein the digitally signed data is also encrypted.

16. The method of claim 15, wherein the digitally signed data is encrypted using a key associated with the endpoint.

17. The method of claim 10, wherein the at least one secure controller and the at least one untrusted controller are electrically isolated from each other.

18. The method of claim 10, wherein the endpoint and the entity are co-located.

19. The method of claim 10, wherein:
    the instruction comprises one or more files; and
    the entity's execution of the instruction comprises:
       reading, via the entity, the one or more files from the untrusted controller; and
       processing, via the entity the one or more files read from the untrusted controller.

20. The method of claim 10, wherein:
    the instruction comprises one or more files; and
    the entity's execution of the instruction comprises:
       sending, from the untrusted controller, the one or more files to the entity; and
       processing, via the entity, the one or more files sent from the untrusted controller.

* * * * *